United States Patent
Terry et al.

(10) Patent No.: US 7,725,084 B2
(45) Date of Patent: May 25, 2010

(54) APPARATUS, AND ASSOCIATED METHOD, FOR COMMUNICATING COMMUNICATION DATA IN A MULTIPLE-INPUT, MULTIPLE-OUTPUT COMMUNICATION SYSTEM

(75) Inventors: John Terry, Garland, TX (US); Olav Tirkkonen, Helsinki (FI)

(73) Assignee: Nokia Corporation, Espoo (FI)

( * ) Notice: Subject to any disclaimer, the term of this patent is extended or adjusted under 35 U.S.C. 154(b) by 677 days.

(21) Appl. No.: 10/720,658

(22) Filed: Nov. 24, 2003

(65) Prior Publication Data

US 2005/0113121 A1 May 26, 2005

(51) Int. Cl.
*H04B 1/02* (2006.01)

(52) U.S. Cl. ................ 455/101; 455/103; 375/267; 375/299

(58) Field of Classification Search ........... 455/63.1, 455/65, 67.13, 562.1, 101, 103; 375/267, 375/299
See application file for complete search history.

(56) References Cited

U.S. PATENT DOCUMENTS

| | | | | |
|---|---|---|---|---|
| 6,560,295 | B1 * | 5/2003 | Hammons et al. | 375/299 |
| 6,636,568 | B2 * | 10/2003 | Kadous | 375/225 |
| 6,731,668 | B2 * | 5/2004 | Ketchum | 375/130 |
| 6,865,237 | B1 * | 3/2005 | Boariu et al. | 375/295 |
| 7,068,628 | B2 * | 6/2006 | Li et al. | 370/334 |
| 7,103,326 | B2 * | 9/2006 | Wu et al. | 455/101 |
| 7,292,644 | B2 * | 11/2007 | Whang et al. | 375/267 |
| 2003/0003863 | A1 * | 1/2003 | Thielecke et al. | 455/39 |
| 2003/0081563 | A1 | 5/2003 | Hottinen et al. | |
| 2003/0227979 | A1 | 12/2003 | Tirkkonen | |
| 2004/0022183 | A1 * | 2/2004 | Li et al. | 370/210 |
| 2004/0052315 | A1 * | 3/2004 | Thielecke et al. | 375/299 |
| 2005/0068918 | A1 * | 3/2005 | Mantravadi et al. | 370/328 |

FOREIGN PATENT DOCUMENTS

| | | |
|---|---|---|
| FI | 20000406 | 8/2001 |
| FI | 20001944 | 3/2002 |
| WO | WO 01/63826 | 8/2001 |
| WO | WO 02/21754 | 3/2002 |

OTHER PUBLICATIONS

Kammoun, I.; Belfiore, J.C.; Signal Processing Advances in Wireless Communications, 2003. SPAWC 2003. 4th IEEE Workshop on Jun. 15-18, 2003 pp. 507-511.*

(Continued)

*Primary Examiner*—Raymond S Dean
(74) *Attorney, Agent, or Firm*—Alston & Bird LLP

(57) ABSTRACT

Apparatus, and an associated method, for facilitating communication of communication data upon a communication channel susceptible to distortion. Both diversity techniques and spatial multiplexing techniques are utilized to compensate for the distortion introduced upon the data during its communication. Separate parts of the communication data are mapped pursuant to separate mapping schemes. The mapping schemes are selected to exhibit different properties. When the communication data is communicated upon the communication channel and delivered to a receiving station, a decoder decodes the data to recover the informational content of the data.

40 Claims, 6 Drawing Sheets

OTHER PUBLICATIONS

Tirkkonen, et al., "Tradeoffs Between Rate, Puncturing and Orthogonality in Space-Time Block Codes," IEEE 2001., pp. 1117-1121.

Tirkkonen, et al., "Improved MIMO Performance with Non-Orthogonal Space-Time Block Codes," *Proc, IEEE Global Telecommunications Conference*, 2001, pp. 1122-1126.

Kashaev, et al. "On Expansion of MIMO Mutual Information in SNR", *ISIT* 2002, Jun. 30-Jul. 5, 2002, p. 252.

International Preliminary Report on Patentability dated May 8, 2007, PCT Application No. PCT/US2004/014194.

* cited by examiner

PER SURVIVING PROCESSING (PSP) GRAPHIC

VOTING SCHEME FOR SPHERICAL CODE DECODER

|     | S1 | S2 | S3 | S4 | S5 | S6 | S7 | S8 | • | • | • | • | • | • | • | • | • | • | • | • | • | S 255 | S 256 |
|-----|----|----|----|----|----|----|----|----|---|---|---|---|---|---|---|---|---|---|---|---|---|-------|-------|
| e1  | 1  |    |    |    |    |    |    |    |   |   |   |   |   |   |   |   |   |   |   |   |   |       |       |
| e2  |    | 1  |    |    |    |    |    |    |   |   |   |   |   |   |   |   |   |   |   |   |   |       |       |
| e3  |    |    |    | 1  |    |    |    |    |   |   |   |   |   |   |   |   |   |   |   |   |   |       |       |
| e4  |    |    |    | 1  |    |    |    |    |   |   |   |   |   |   |   |   |   |   |   |   |   |       |       |
| e5  |    |    |    |    |    |    |    |    |   |   |   |   |   |   |   |   |   | 1 |   |   |   |       |       |
| e6  |    |    |    |    |    | 1  |    |    |   |   |   |   |   |   |   |   |   |   |   |   |   |       |       |
| e7  |    |    |    |    |    |    |    |    |   |   |   |   |   |   |   |   |   | 1 |   |   |   |       |       |
| e8  |    |    |    |    |    |    |    | 1  |   |   |   |   |   |   |   |   |   |   |   |   |   |       |       |
| e9  |    |    |    |    |    |    |    |    |   |   |   |   |   |   |   |   |   |   |   |   |   |       | 1     |
| e10 |    |    |    |    |    |    |    |    |   |   |   |   |   |   |   |   |   | 1 |   |   |   |       |       |
| VT* | 1  | 1  |    | 2  |    |    |    | 1  |   | 1 |   |   |   |   |   |   |   | 3 |   |   |   |       | 1     |

*VT-VOTING TOTAL, S1-SPHERICAL CODE #1, E1-ERROR SEQUENCE 1

APPARATUS, AND ASSOCIATED METHOD, FOR COMMUNICATING COMMUNICATION DATA IN A MULTIPLE-INPUT, MULTIPLE-OUTPUT COMMUNICATION SYSTEM

The present invention relates generally to a manner by which to place communication data in a form to facilitate its communication upon a communication channel to a receiving station, and to recover the informational content of the data once received at the receiving station. More particularly, the present invention relates to apparatus, and an associated method, by which to modulate communication data to permit its communication as independent data streams in an MIMO (Multiple-Input, Multiple-Output) communication system and to decode the communication data once delivered to a receiving station.

Spatial multiplexing and diversity techniques are together used. And, a decoder is provided that reduces the complexity required by which to determine values of the communication data delivered to the receiving station. Portions of the communication data are provided to separate modulators that map the communication data portions provided thereto according to separate mapping schemes. The mapping schemes are selected to exhibit differing properties. Advantage is taken of these differing properties at the receiving station to achieve good maximum likelihood performance at an acceptable level of computational complexity.

BACKGROUND OF THE INVENTION

A communication system provides a mechanism by which to communicate communication data between communication stations of a set of communication stations. At least one of the communication stations of the set forms a sending station. And, at least another of the communication stations of the set of communication stations forms a receiving station. Communication data originated at or, otherwise provided to, a sending station is communicated to a receiving station by way of a communication channel. The receiving station operates to detect the communication data communicated upon the communication channel and to recover the informational content thereof.

Different types of communication systems have been developed and deployed to effectuate different types of communication services. As advancements in communication, and other, technologies permit, new types of communication systems are developed and deployed. And, existing communication systems are adapted, also to make use of the technological advancements.

A radio communication system is an exemplary type of communication system. Various radio communication systems have been made possible as a result of technological advancements. And, existing radio communication systems have also benefited from technological advancements.

A radio communication system differs with a conventional wireline communication system in that the communication channel that connects communication stations operable therein is defined, at least in part, by a radio channel formed on a radio link extending between the communication stations. The need to use a wireline to interconnect the communication stations is obviated.

Various advantages are provided when the need for a wireline connection is obviated. Communications between locations at which wireline connections would be inconvenient or impractical are facilitated as radio channels are used upon which to communicate the communication data. And, a radio communication system is implementable as a mobile communication system in which one or more of the communication stations of the communication system are permitted mobility. Additionally, the costs associated with initial deployment of a radio communication system are generally less than the costs associated with initial deployment of a wireline counterpart. Accordingly, a radio communication system is generally more economically implemented and a corresponding wireline counterpart.

Many modern radio, as well as other, communication systems make use of digital communication techniques. When digital communication techniques are utilized in the communication system, the communication data that is to be communicated is by a sending station is digitized, and the communication data, once digitized, is communicated. In a packet communication system, the data is formatted into packets or frames of data. When formatted into the packets or frames, for instance, the packets or frames are communicated during discrete intervals.

If the communication channel upon which the communication data is communicated is free of distortion, values of the communication data, when received at the receiving station, identically correspond in values with corresponding values of the communication data when sent by the sending station. Communication channels, however, are not ideal. The values of the communication data differ, due to their communication upon a non-ideal communication channel, in value with the values when sent by the sending station. Additional distortion is sometimes further caused at the receiving station as the communication data is operated upon, prior to recovering the informational content thereof.

Channel conditions on a radio communication channel are sometimes particularly problematical. Multi-path communication conditions on a radio channel, for instance, cause communication data to fade during its communication thereon to a receiving station. Multi-path transmission conditions are sometimes referred to as being fading conditions. Fading of the communication data alters the values of the communication data, or portions thereof, such that, when detected at the receiving station, the values of the communication data differ with corresponding data when sent by the sending station.

Various manners are conventionally used by which to attempt to compensate for the distortion introduced upon the communication data. For instance, by increasing the diversity of the data, through the use of a diversity technique, the likelihood that the informational content of the communication data can be recovered at the receiving station is generally increased.

And, in a communication system that utilizes multiple transmit antennas, such as in a multiple-input, multiple-output communication system, spatial multiplexing is sometimes used. The use of spatial multiplexing compensate for the distortion.

While both techniques, i.e., diversity techniques and spatial multiplexing techniques, each provide separate manners by which to increase the likelihood that the informational content of the communication data can be recovered, such techniques are generally not used together. The complexity required of decoder apparatus at the receiving station would be so computationally intensive as to be prohibitive to implement. Conventional manners by which to form the communication data according to diversity and spatial multiplexing techniques would require large constellation sizes and trellises having numerous states. The computational complexity of a maximum likelihood decoder would not be practical to implement, especially when the decoder would be required to operate upon communication data communicated at high data rates. Alternately, iterative decoding techniques could be attempted. However, conventionally, mutual interference would cause iterative solutions to converge to incorrect local minima.

While the use of both diversity and spatial multiplexing techniques, used together, would improve the likelihood that the informational content of communication data could be recovered, the impracticality of its implementation in conventional systems has prevented their use together in a communication system. If a manner could be provided by which to utilize both diversity and spatial multiplexing techniques in a communication system, improved communication performance of the communication system would be possible.

It is in light of this background information related to the communication of communication data in a communication system susceptible to distortion that the significant improvements of the present invention have evolved.

SUMMARY OF THE INVENTION

The present invention, accordingly, advantageously provides apparatus, and an associated method, by which to place communication data in a form to facilitate its communication upon a communication channel to a receiving station.

The present invention further advantageously provides apparatus, and an associated method, by which to recover the informational content of the communication data, once received at a receiving station.

Through operation of an embodiment of the present invention, a manner is provided by which to modulate communication data to permit its communication as independent data streams in a multiple-input, multiple-output (MIMO) communication system and to decode the communication data once delivered to a receiving station.

In one aspect of the present invention, diversity and spatial multiplexing techniques are utilized to combat the effects of distortion introduced upon communication data during its communication upon a communication channel. Higher-order modulation is performed, advantageously to permit high data-rate communication services to be provided.

A decoder is provided that operates to decode received communication data, formed utilizing the diversity and spatial multiplexing techniques, that is of reduced complexity relative to a decoder that would otherwise be required to operate upon such communication data. Reduced complexity is provided as unlikely paths are removed out of consideration as possible values of the communicated data. Corresponding maximum likelihood calculations need not, accordingly, be performed.

At the sending station, portions of the communication data are provided to separate modulators. That is to say, the first portion of the communication data is provided to a first modulator that maps the portion of the communication data applied thereto according to a first selected mapping scheme. And, at least a second portion of the communication data is provided to a second modulator that maps the communication data provided thereto according to at least a second mapping scheme. The first and second mapping schemes are selected to exhibit differing properties. For instance, the mapping schemes are selected such that the constellation sets of the separate mapping schemes comprise dissimilar symbol points or in which the distances between the symbol points of the separate mapping schemes are dissimilar. Subsequent to operation of the modulators to map the data applied thereto to symbol values, the modulated communication data is applied to antenna transducers of a set of antenna transducers. In one implementation, the modulated communication data formed by each of the mappers is provided to each of the antenna transducers of the set. In other implementations, fewer than all of the antenna transducers of the set of antenna transducer are provided within the modulated communication data formed by each of the mappers. But, at least one of the antenna transducers is connected to receive modulated communication data formed by more than one mapper.

The receiving station makes use of the dissimilar properties exhibited by the separate mappers to which portions of the communication data are provided. The dissimilarities between the mapping schemes permit blind interference rejection of one of the layers of mapped symbols, i.e., symbols associated with one or the other of the mapping schemes. Through use of the multi-antenna transducer configuration, diversity is provided, and spatial multiplexing is further provided.

Use of higher order constellation sets into which to map the data also facilitates communication of significant amounts of data within a given time period, thereby to facilitate communication of data at high data rates. Use of an embodiment of the present invention is, accordingly, advantageously implemented in a wireless local area network (WLAN) that operates generally pursuant to an IEEE 802.11 communication standard. Through implementation of an embodiment of the present invention in such a WLAN, improved communications, i.e., at higher data rates and with improved detection when received subsequent to communication on a non-ideal communication channel are possible.

In these and other aspects, therefore, apparatus, and an associated method, is provided for a communication system. The communication system includes a sending station that sends communication data upon a communication channel susceptible to distortion. The communication data is placed in a form to facilitate its communication upon the communication channel. A first mapper is adapted to receive first representations of a first portion of the communication data. The first mapper maps the first representations of the first portion of the communication data into first mapped values according to a first mapping scheme. A second mapper is adapted to receive second representations of a second portion of the communication data. The second mapper maps the second representations of the communication data into second mapped values according to a second mapping scheme. The second mapping scheme exhibiting a mapping property that differs with the first mapping scheme. A set of antenna transducers comprises a first antenna transducer and at least a second antenna transducer. At least a selected one of the antenna transducers of the set is adapted to receive at least parts of the first mapped values and the second mapped values formed by the first mapper and the second mapper, respectively. The at least the selected one of the antenna transducers of the set transduces the first and second mapped values, respectively, applied thereto into electromagnetic form for communication upon the communication channel.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
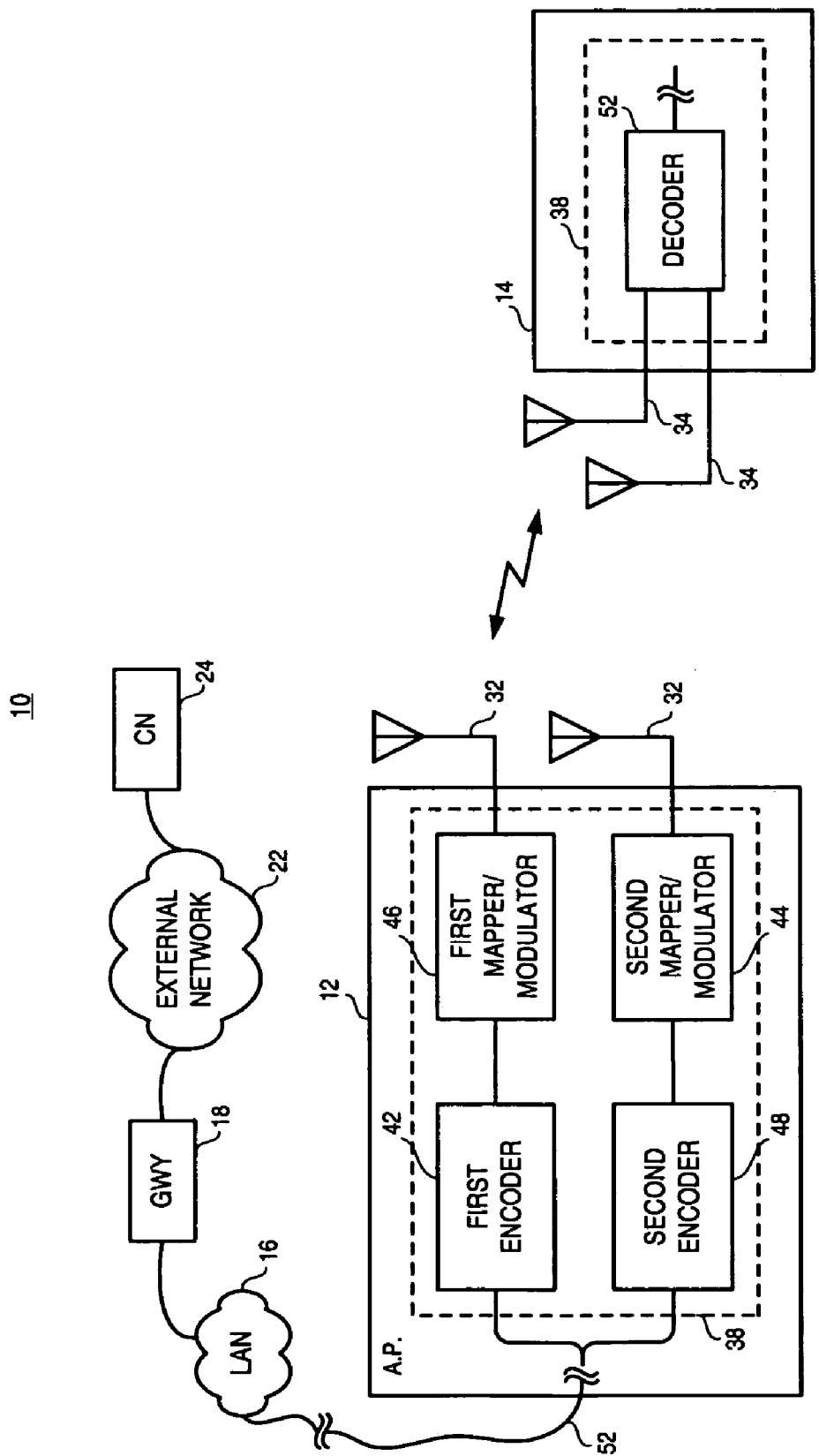
FIG. 1 illustrates a functional block diagram of a communication system in which an embodiment of the present invention is operable.

Referring first to FIG. 1, portions of a radio communication system, shown generally at 10, provide for radio communication of data between radio communication stations. Two radio communication stations, communication station 12 and communication station 14, are shown in FIG. 1.

In the exemplary implementation, the communication system forms a WLAN (Wireless Local Area Network) in which the communication station 12 forms an access point (AP) and the communication station 14 forms a mobile node (MN) operable to communicate with the access point. The communication stations of the WLAN are constructed to be operable generally pursuant to the operating protocols set forth in a variant of an IEEE 802.11 operating standard specification. While the following description of exemplary operation of the communication system shall be described with respect to its implementation in which the communication system forms a WLAN, the teachings of the present invention are analogously also implementable in communication systems that are constructed in other manners.

Additionally, the following description shall describe exemplary operation of an embodiment of the present invention with respect to the communication of communication data that is sourced at the access point 12 to be terminated at the mobile node 14. Analogous communication of data sourced at the mobile node is carried out in analogous manner and can be analogously described. That is to say, communication of data by the mobile node to the access point is carried out in manners corresponding to, but reverse to that of, the manner by which communications are effectuated by the access point to the mobile node.

The access point 12 forms part of a WLAN (Wireless Local Area Network) 16 that is connected, here by way of a gateway (GWY) 18, to an external network 22. A correspondent node (CN) 24 is coupled to the external network. The correspondent node (CN) is representative of a communication entity at which communication data is sourced or to which communication data is terminated. A communication path is formable between the correspondent node and the mobile node by way of the network part of the communication system and upon radio channels defined upon a radio air interface 16 extending between the access point and the mobile node.

Both the access point and the mobile node include transceiver circuitry for sending and for receiving communication data by way of the radio air interface. As mentioned previously, the communication channel upon which communication data is communicated is non-ideal and communication data communicated thereon is susceptible to distortion. And, of particular interest here, is the distortion introduced upon the communication data during its communication upon radio channels defined upon the radio air interface. Here, the access point and the mobile node each include a plurality of antenna transducers. A set of antenna transducers 32 are embodied at the access point 12, and a set of antenna transducers 34 are embodied at the mobile node 14. The access point and mobile node thereby define an MIMO (Multiple-Input, Multiple-Output) communication system.

Data sourced at the network part of the communication system is transduced into electromagnetic form by the antenna transducers 32 to which the communication data is provided. Diversity techniques are sometimes utilized to combat the effects of fading conditions on the communication channels of the radio air interface. And, spatial multiplexing techniques are sometimes utilized also to combat the effects of fading on the communication channels. However, the use of both diversity techniques and spatial multiplexing techniques are generally not utilized due to the complexity required at a receiving station to recover the informational content, i.e., the values of the communication data as actually-transmitted when both such techniques are concurrently used. The computational complexity required of a decoder would be prohibitively high utilizing conventional decoding and recovery techniques.

The access point 12 includes apparatus 38 of an embodiment of the present invention by which to utilize both diversity and spatial multiplexing techniques to increase the likelihood that the communication data communicated by way of the radio air interface shall be delivered to the mobile node in a form to permit the recovery of the informational content of the communication data. And, the mobile node includes further apparatus 38 of an embodiment of the present invention that estimates values of the communication data while requiring only reduced levels of computation, permitting operation in real-time even when data is communicated at high data rates. The apparatus 38 includes a first mapper/modulator 42 and at least a second mapper/modulator 44. A first encoder 42 is associated with the mapper/modulator 46, and a second encoder 48 is associated with the second mapper/modulator 44.

Communication data that is to be communicated by the access point is formed on the line 52, provided thereon, e.g., by the correspondent node 24. Portions of the communication data are provided to the first and second encoders 42 and 48, respectively. The portions of the communication data provided to the separate ones of the encoders are dissimilar portions of the communication data or are of overlapping portions of the communication data. The encoders encode the portions of the communication data provided thereto to form encoded representations of the communication data.

The encoded representations of the communication data are provided to the mapper/modulator associated with the respective encoders. The mapper/modulator 46 operates pursuant to a first mapping scheme to map values provided thereto into first mapped values. And, the second mapper/modulator 44 analogously operates to map the representations of the communication data applied thereto according to a second mapping scheme. The properties of the mapping scheme pursuant to which the mappers/modulators 42 and 44 are operable pursuant to differing schemes that exhibit differing properties.

In the exemplary implementation, the differing properties comprise differing constellation sets to which the representations of the communication data provided thereto are mapped. The symbols of the differing constellation sets differ in symbol values and separation distances between the symbols of the respective constellation sets. In the exemplary implementation, the first constellation set used by the first mapper/modulator comprises symbol values contained on a sphere, i.e., a spherical modulation scheme. And, the second constellation set is formed of symbols taken from a lattice configuration, i.e., the scheme forms a lattice modulation scheme.

The symbols into which the representations of the communication data are mapped by the respective mappers/modulators are each provided to the antenna transducers 32 of the set of antenna transducers associated with the access point. The transducers operate to transduce the symbols into electromagnetic form for communication by way of the radio air interface to the mobile node.

The antenna transducers 34 of the mobile node detect the communicated data delivered to the mobile node and convert the electromagnetic representations into electrical form. The values are provided to a decoder 52 that forms part of the apparatus 38 of an embodiment of the present invention. The decoder operates to decode the received data to provide estimates of the values of the communicated data. And, once decoded representations are formed by the decoder, the decoded representations are further operated upon by other structure of the mobile node.

Through appropriate selection of the mapping scheme utilized by the mapper/modulator of the sending station, i.e., the access point, error protection is afforded to the data that is communicated by the application of both diversity and through the use of spatial multiplexing. A layered code is provided in which each layer of the layered code is defined over all of the antenna transducers 32, as well as the receive antenna transducers 34. A space time code (STC) is utilized in which the layers are added together to form a composite code that also satisfies space time coding design criteria.

A first layer of the code is formed of a concatenate STBC (Space Time Block Code) with a trellis code. According to the space time coding design criteria, the essential quantity of interest is the code word difference matrix. For the STBC/TCM (Space Time Block Code/Trellis Coded Modulation) layers, the code word difference matrix is given by:

$$D(e,c) = \begin{bmatrix} [c_2(0)-e_2(0)]^* & [c_1(0)-e_1(0)] & \ldots & [c_1(l)-e_1(l)] \\ -[c_1(0)-e_1(0)]^* & [c_2(0)-e_2(0)] & \ldots & [c_2(l)-e_2(l)] \end{bmatrix} \quad (1)$$

wherein the symbols c and e are generated from a TCM scheme that is designed for AWGN (Average White Gaussian Noise) channels. To determine the level of coding advantage for this composite code, an outer product of the code word difference matrix, as just-described, is computed to be:

$$\Delta\Psi = D(e,c)D(e,c)^H = \begin{bmatrix} \Delta_{min}^2 & 0 \\ 0 & \Delta_{min}^2 \end{bmatrix} \quad (2)$$

wherein $\Delta_{min} = \min(d_{free}, d_{coset})$ wherein $d_{free}$ forms a free distance of the code used to select a coset and $d_{coset}$ defines the minimum distance within a coset. Using the assumption that $_{free}$ is greater than $d_{coset}$, the shortest error event ensures a squared code word difference matrix given by $d_{min} = d_{coset}$. If, conversely, $d_{free}$ is less than $d_{coset}$, elimination of unwarranted interference is facilitated. However, the constraint length would need to be very long to reduce the unwarranted interference to a moderate level.

The second layer of the combined code is formed of a concatenated STBC (Space Time Block Code) using spherical modulation. The layers, i.e., the first and second layers, are summed at the sending station formed at the access point and the individual layers would not normally be separable. When T denotes a transform of scalar inputs:

$$T(l,s) = \begin{bmatrix} [l_2(0)+s_2(0)]^* & [l_1(0)+s_1(0)] & \ldots & [l_2(p)-s_2(p)] \\ -[l_1(0)+s_1(0)]^* & [l_2(0)+s_2(0)] & \ldots & [l_1(p)-s_1(p)] \end{bmatrix} \quad (3)$$

Advantage is taken, pursuant to an embodiment of the present invention, of the low modulus property of the constellation of one layer and trellis decoding of the other layer to achieve maximum likelihood (ML) performance exhibiting high probabilities and acceptable complexity. To meet the space time coding design criteria, the rank of the code word difference matrix is full to achieve full diversity. This requirement is attained when the following necessary conditions hold true.

Figure 2:
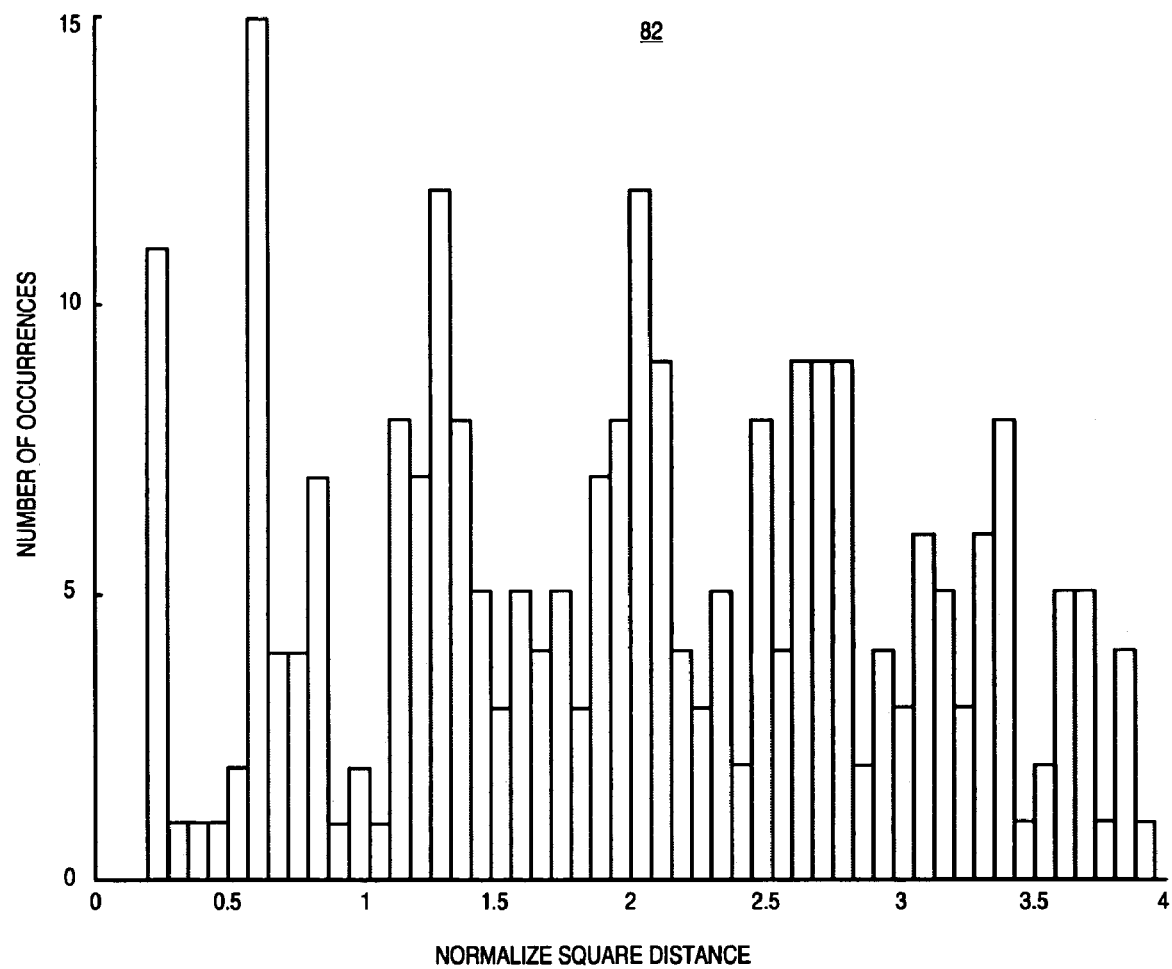
FIG. 2 illustrates a graphical representation of an exemplary error spectra of an exemplary constellation set by which a portion of communication data is modulated during operation of the communication system shown in FIG. 1.
Figure 3:
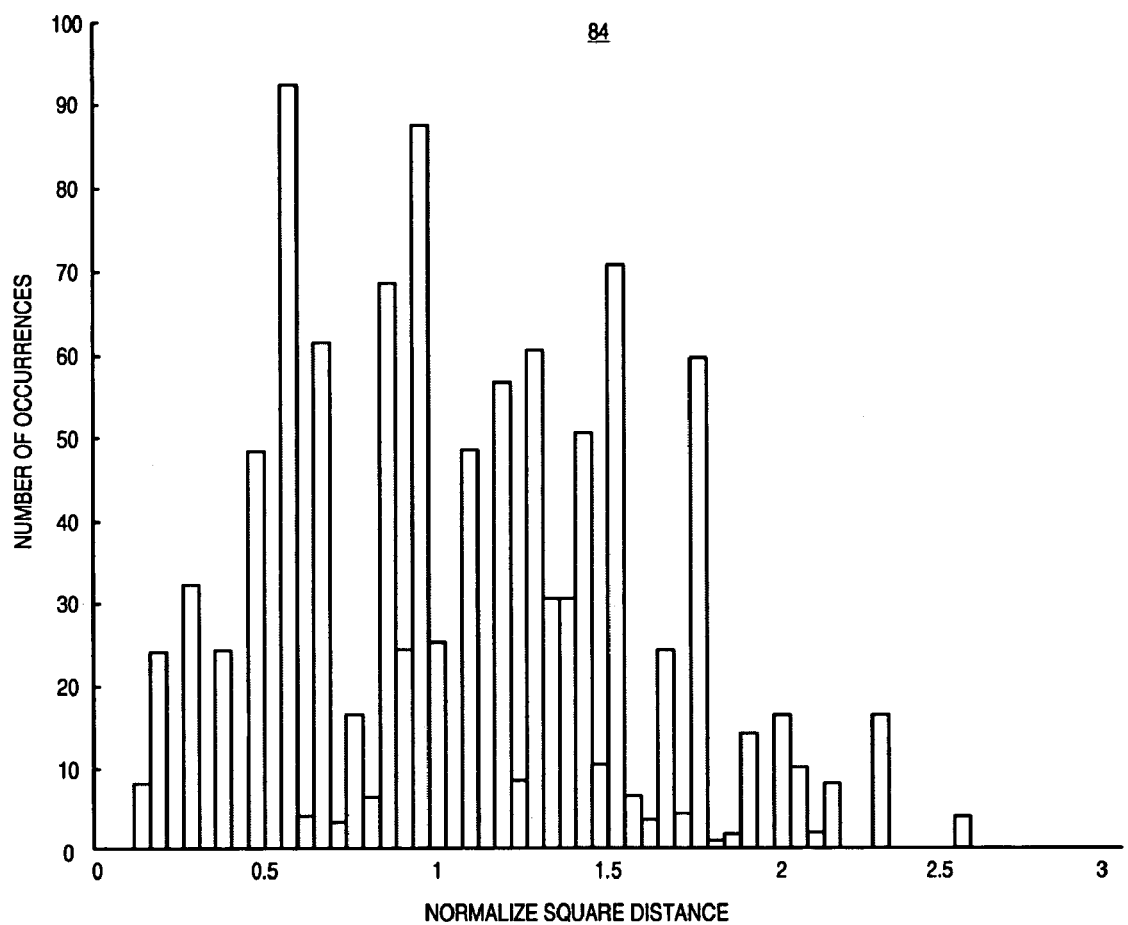
FIG. 3 illustrates another graphical representation, analogous to the representation shown in FIG. 2, but here of the error spectra of another constellation set used by which to map another portion of the communication data communicated during operation of the communication system shown in FIG. 1.

$c\epsilon_{C_1}^2$ and $1l\epsilon_{C_2}^2$ $C_1^2 \cap C_2^2 = 0$ $\Delta c \neq \Delta l$ wherein $\Delta c$ and $\Delta l$ denote the error spectra for the separate layers. The graphical representations 82 and 84 shown in FIGS. 2 and 3, respectively, illustrate exemplary overlapping error spectra for the different constellations. The goal is to avoid, to the extent possible, any overlapping error spectra between the layers. And, a preferred design is one in which the spectra between the two layers share the fewest errors in common.

At the receiving station forming the mobile node, a modified distance metric is used to exploit the low modulus property of the spherical code. The received signal after linear decoding of the space time block code is given by:

$$R_i = (|h_1|^2 + |h_2|^2 + |h_3|^2 + |h_4|^2)(l_i + c_i) + n_i \quad (4)$$

Hence, the metrics computed at the receiver are:

$$\|R_i - (|h_1|^2 + |h_2|^2 + |h_3|^2 + |h_4|^2)(l_i + c_j)\|^2 \quad (5)$$

The maximum likelihood decoder at the mobile node requires a search over all pairs of $l_i$, $c_j$ to find the pair that minimizes the norm. Normally, the maximum likelihood solution is computational prohibitive. However, pursuant to an embodiment of the present invention, the following modified norm is utilized:

$$\|R_1 - [|h_1|^2 + |h_2|^2 + |h_3|^2 + |h_4|^2]l_1\|^2 + \|R_2 - ((h_1)^2 + (h_2)^2 + (h_3)^2 + (h_4)^2)(l_2)\|^2 - (|h_1|^2 + |h_2|^2 + |h_3|^2 + |h_4|^2)| \quad (6)$$

Figure 4:
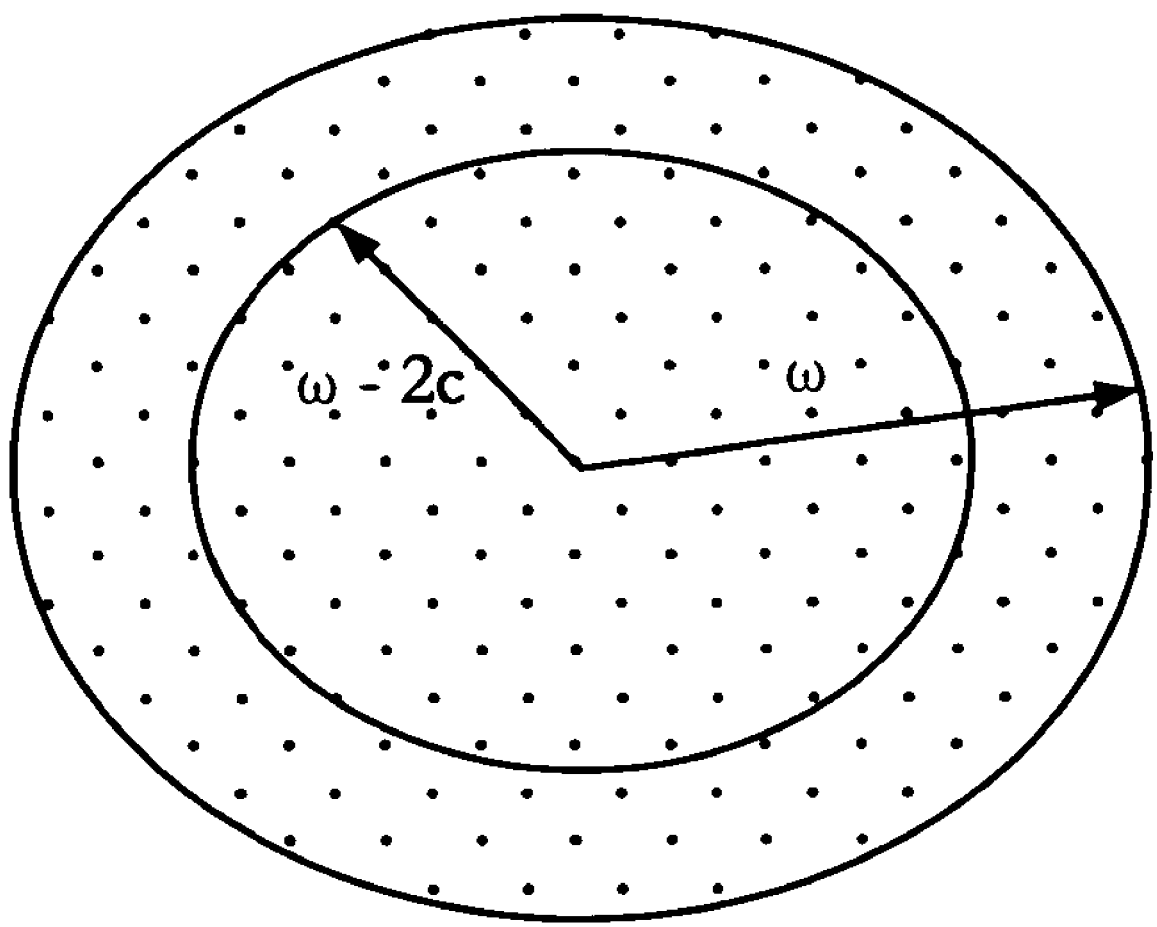
FIG. 4 illustrates a graphical representation of an error spectra comparison of the constellations represented by the error spectra shown in FIGS. 2 and 3.

Here, exploitation is made of the fact that the magnitude of $c_1^2$ plus the magnitude of $c_2^2 = 1$ as the coordinates are drawn from a four-dimensional sphere. In the absence of noise or a very long constraint length, this expression is sufficient to decode a TCM (Trellis Coded Modulated) layer. Geometrically this metric can be thought of as the point that is closest in distance to a sphere of radius $h_1^2 + h_2^2 + h_3^2 + h_4^2$. The graphical representation 86 shown in FIG. 4 depicts this concept.

An additional algorithm is proposed pursuant to operation of an embodiment of the present invention. The additional algorithm is here referred to as an "Per Surviving Processing" (PSP) algorithm. The PSP algorithm pertains, in significant part, to a manner by which to retain P of the paths to calculate the shortest error event, which has the P smallest cumulative metrics at the current stage in the trellis of the decoder.

Then, maximum likelihood search is performed over the subspace generated by the P smallest cumulative metric paths is performed in conjunction with a voting scheme to determine which spherical code sequence was transmitted.

Figures 5, 6:
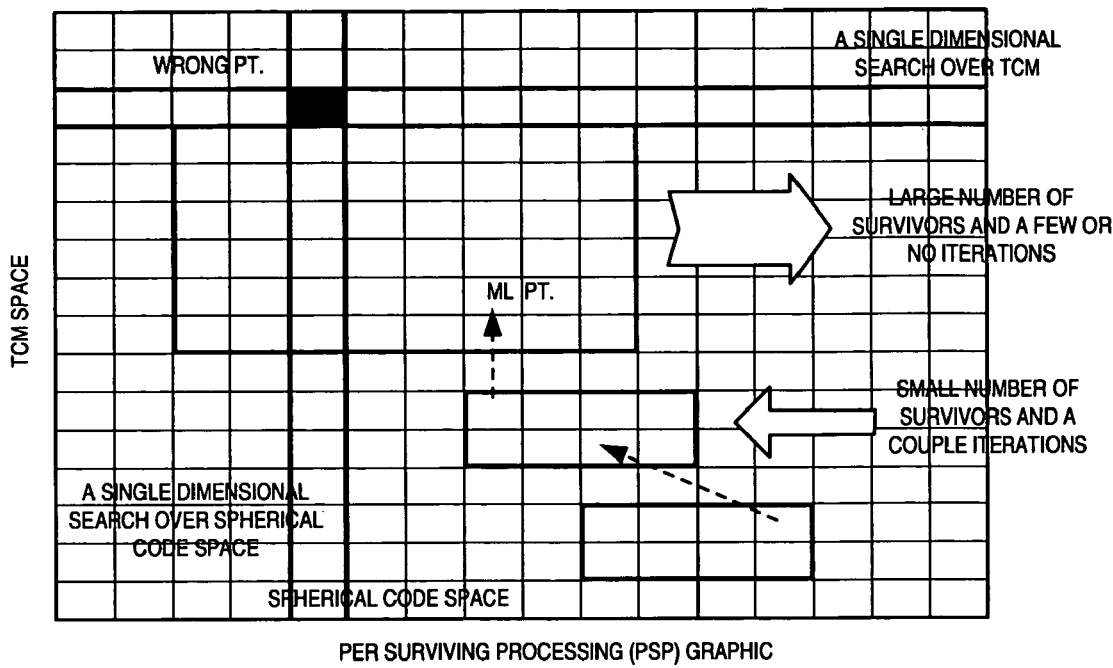
FIG. 5 illustrates a geometric representation of a region of support of an exemplary layered matrix modulation scheme implemented during modulation of the communication system shown in FIG. 1.
FIG. 6 illustrates a representation of a manner by which selection is made of the value of a communication data symbol, received at a receiving station, pursuant to a per-surviving processing technique.

The voting scheme, represented at 88 in FIG. 5, is conducted utilizing a table having P rows corresponding to the P smallest cumulative branches at a current state and L columns for each spherical code in the constellation. For each of the P cumulative branches, a metric is computed over all of the spherical codes. For each row, a "1" is listed in the column corresponding to the spherical code that minimizes the metric. The column exhibiting the largest sum is voted to be the solution. In the exemplary implementation, in the event of a tie, i.e., more than one column exhibits the same sum, the column whose cumulative metric over all of the P paths, is the smallest, is chosen as the solution.

In an alternate implementation, and as indicated by the graphic representation shown generally at 92 in FIG. 6, iteration is performed between the layers after interference is subtracted from the other layer until the interference-free performance is achieved at each layer.

Figure 7:
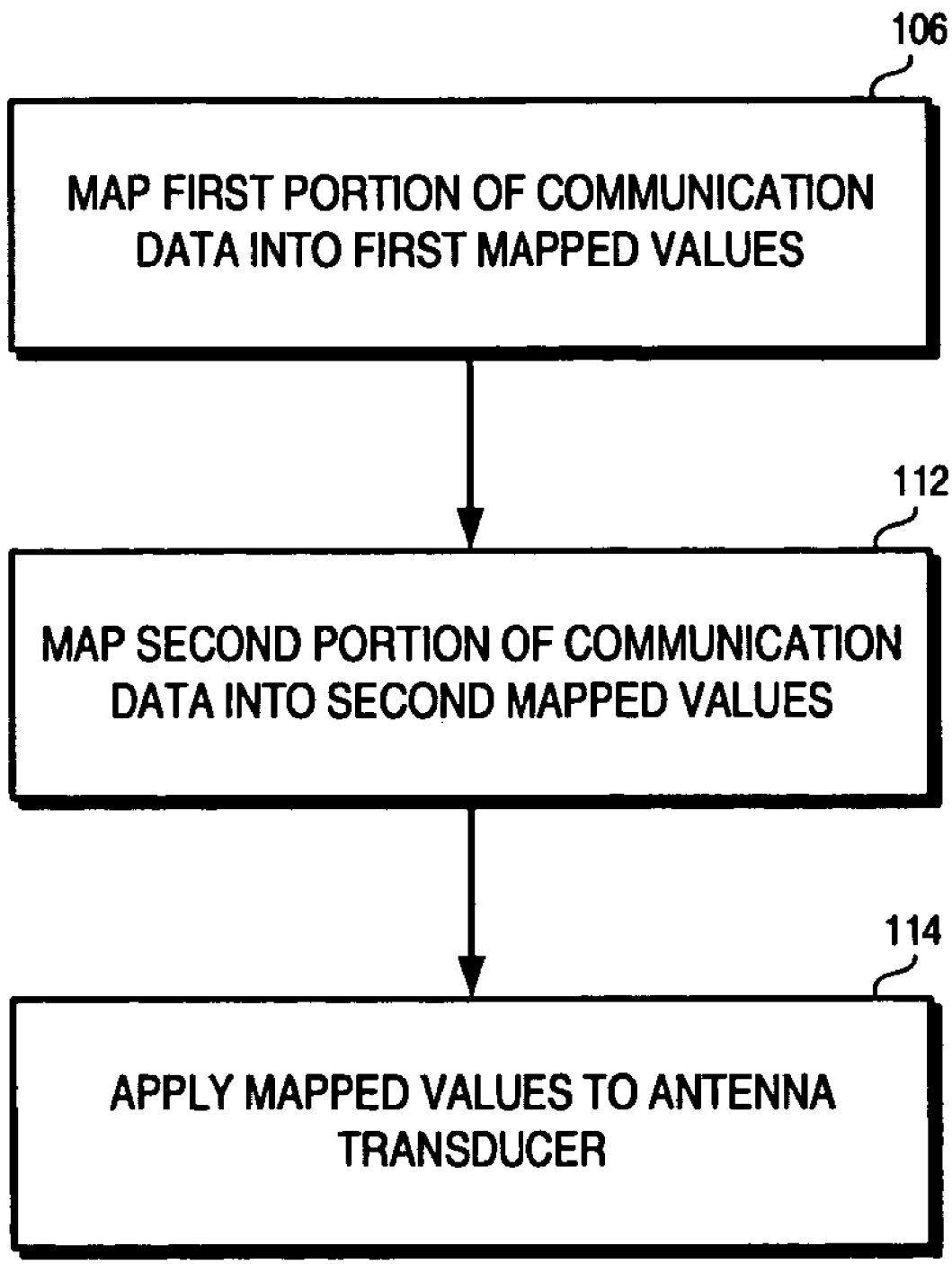
FIG. 7 illustrates a method flow diagram listing the method steps of the method of operation of an embodiment of the present invention.

FIG. 7 illustrates a method flow diagram, shown generally at 102, representative of the method of operation of an embodiment of the present invention. The method facilitates communication of communication data upon a communication channel that is susceptible to distortion.

First, and as indicated by the block 106, a first representation of a first portion of the communication data is mapped into first mapped values according to a first mapping scheme. And, as indicated by the block 112, second representations of a second portion of the communication data is mapped into second mapped values according to a second mapping scheme. The second mapping scheme exhibits a mapping property that differs with the first mapping scheme.

Thereafter, and as indicated by the block 114, selected ones of the first and second mapped values are applied to at least a selected one of a set of antenna transducers. At least parts of the first mapped values and the second mapped values are applied to at least a selected one of the set of the antenna transducers.

The previous descriptions are of preferred examples for implementing the invention, and the scope of the invention should not necessarily be limited by this description. The scope of the present invention is defined by the following claims.

The invention claimed is:

1. An apparatus comprising:
a first mapper configured to receive first representations of a first portion of communication data, said first mapper configured to map the first representations of the first portion of the communication data into first mapped values according to a first mapping scheme; and
a second mapper configured to receive second representations of a second portion of the communication data, said second mapper configured to map the second representations of the communication data into second mapped values according to a second mapping scheme, the second mapping scheme exhibiting a mapping property that differs with the first mapping scheme,
wherein the first mapper is configured to direct transmission of the first mapped values to a first antenna transducer among a plurality of antenna transducers and wherein the second mapper is configured to direct transmission of the second mapped values to a second antenna transducer among the plurality of antenna transducers, the first and second antenna transducers configured to receive and transduce only the first mapped values and the second mapped values, respectively, into electromagnetic form for communication upon a communication channel, and
wherein the apparatus is configured to define a code comprising a plurality of layers defined over the first antenna transducer and the second antenna transducer, and wherein the apparatus is configured to form a composite code from each of the layers of the code, and
wherein a second layer of the code comprises a concatenated space time block code (STBC) formed by spherical modulation, wherein at least the first mapper is configured to perform the spherical modulation.

2. The apparatus of claim 1 further comprising a first encoder configured to receive the first portion of the communication data, said first encoder configured to encode the first portion of the communication data according to a first encoding technique and wherein the first representations of the first portion of the communication data received by said first mapper comprises first-encoded values formed by said first encoder.

3. The apparatus of claim 1 further comprising a second encoder configured to receive the second portion of the communication data, said second encoder configured to encode the second portion of the communication data according to a second encoding technique and wherein the second representations of the second portion of the communication data received by said second mapper comprises second-encoded values formed by said second encoder.

4. The apparatus of claim 1, wherein the first mapped values into which said first mapper is configured to map the first representations of the first portion of the communication data comprise a first set of mapped values, wherein the second mapped values into which said second mapper is configured to map the second representations of the second portion of the communication data comprise a second set of mapped values, and wherein elements of the first set of mapped values differ in value with elements of the second set of mapped values.

5. The apparatus of claim 4 wherein the first set of mapped values and the second set of mapped values formed by said first mapper and said second mapper, respectively, are formed of mutually-exclusive elements.

6. The apparatus of claim 4 wherein the mapping property exhibited by the second mapping scheme that differs with that of the first mapping scheme comprises vector magnitudes that differ.

7. The apparatus of claim 1 wherein the first mapped values into which said first mapper is configured to map the first representations of the first portion of the communication data comprise a first set of mapped values that exhibits first geometric differences therebetween, wherein the second mapped values into which said second representations of the second portion of the communication data comprise a second set of map values that exhibit second geometric differences therebetween.

8. The apparatus of claim 7 wherein the first geometric differences between the mapped values of the first set and the second geometric differences between the mapped values of the second set are mutually exclusive.

9. The apparatus of claim 7 wherein the mapping property exhibited by the second mapping scheme that differs with that of the first mapping scheme comprises second geometric differences that differ in lengths with lengths of the first geometric differences.

10. The apparatus of claim 1 wherein the mapping by which said first mapper is configured to map the first representations and the mapping by which said second mapper is configured to map the second representations are together selected to define a layered code having combined values that are applied to a respective one of the plurality of antenna transducers.

11. The apparatus of claim 1, wherein the apparatus is further configured to facilitate communications with a receiving station configured to receive the first and second mapped values, the receiving station comprises a modified maximum likelihood decoder configured to:
 exploit the difference in mapping properties between the first and second mapped values;
 receive indications of the communication data communicated upon the communication channel and delivered to the receiving station;
 determine a maximum likelihood path that defines selection of values of the communication data, the maximum likelihood path selected from amongst a set of possible paths, each defining communication data value possibilities.

12. The apparatus of claim 11 wherein the set of possible paths from amongst which said maximum likelihood decoder is configured to select the maximum likelihood path comprises fewer than all of the possible paths.

13. The apparatus of claim 11 wherein the set of possible paths from amongst which said maximum likelihood decoder is configured to select the maximum likelihood path is selected responsive to at least the first mapping scheme pursuant to which said first mapper is configured to map the first representations.

14. The apparatus of claim 13 wherein the set of possible paths from amongst which said maximum likelihood decoder is configured to select the maximum likelihood path is further selected responsive to the second mapping scheme pursuant to which said second mapper is configured to map the second representations.

15. A method comprising:
 mapping first representations of a first portion of communication data into first mapped values according to a first mapping scheme;
 mapping second representations of a second portion of the communication data into second mapped values according to a second mapping scheme, the second mapping scheme exhibiting a mapping property that differs with the first mapping scheme;
 facilitating selection of the first mapped values and the second mapped values;
 directing transmission of only the first mapped values to a first antenna transducer among a plurality of antenna transducers and directing transmission of only the second mapped values to a second antenna transducer among a plurality of antenna transducers;
 defining a code, via an apparatus, comprising a plurality of layers defined over the first antenna transducer and the second antenna transducer; and
 forming a composite code from each of the layers of the code,
 wherein a second layer of the code comprises a concatenated space time block code (STBC) formed by spherical modulation, wherein at least a first mapper performs the spherical modulation.

16. The method of claim 15, further comprising:
 transducing the selected first mapped values and the selected second mapped values, applied during said selection, into electromagnetic form; and
 delivering, by way of the communication channel, the selected first and second mapped values, respectively, to a receiving station.

17. The method of claim 16 further comprising, decoding indications of communication data received at the receiving station, the decoding comprising determining a maximum likelihood path that defines selection of values of the communication data, the maximum likelihood path selected from amongst a set of possible paths, each defining communication data value possibilities.

18. The method of claim 17, wherein, prior to said decoding, the method further comprises facilitating selection of the set of possible paths from which the maximum likelihood path is formable.

19. The method of claim 18 wherein the set selected during said selection of the set is selected responsive to the first and second mapping schemes used during said mapping.

20. An apparatus comprising:
 means for mapping first representations of a first portion of the communication data into first mapped values according to a first mapping scheme;
 means for mapping second representations of a second portion of communication data into second mapped values according to a second mapping scheme, the second mapping scheme exhibiting a mapping property that differs with the first mapping scheme;
 means for facilitating selection of the first mapped values and the second mapped values; and
 means for directing transmission of the first mapped values and the second mapped values to only a respective one of a plurality of antenna transducers, and wherein the plurality of antenna transducers transduce the first mapped values and the second mapped values into electromagnetic form for communication upon a communication channel;
 means for defining a code comprising a plurality of layers defined over the first antenna transducer and the second antenna transducer; and
 means for forming a composite code from each of the layers of the code,
 wherein a second layer of the code comprises a concatenated space time block code (STBC) formed by spherical modulation, wherein at least the means for mapping said first representations performs the spherical modulation.

21. The apparatus of claim 20, further comprising means for receiving and encoding the first portion of the communication data, according to a first encoding technique to generate the first representations, the first representations comprise a first plurality of encoded values.

22. The apparatus of claim 20, further comprising means for receiving and encoding the second portion of the communication data according to a second encoding technique to generate the second representations, the second representations comprise a second plurality of encoded values.

23. The apparatus of claim 1, wherein the first mapping scheme generates a first constellation set comprising a first plurality of symbol points and wherein the second mapping scheme generates a second constellation set comprising a second plurality of symbol points, wherein a first distance between each of the first plurality of symbol points is different from a second distance between each of the second plurality of symbol points.

24. The method of claim 15, wherein prior to facilitating transmission of only the first mapped values, the method further comprises:

generating, according to the first mapping scheme, a first constellation set comprising a first plurality of symbol points; and generating, according to the second mapping scheme, a second constellation set comprising a second plurality of symbol points, wherein a first distance between each of the first plurality of symbol points is different from a second distance between each of the second plurality of symbol points.

25. The apparatus of claim 20, wherein the first mapping scheme generates a first constellation set comprising a first plurality of symbol points and wherein the second mapping scheme generates a second constellation set comprising a second plurality of symbol points, wherein a first distance between each of the first plurality of symbol points is different from a second distance between each of the second plurality of symbol points.

26. The apparatus of claim 1, wherein the first mapping scheme comprises a spherical modulation scheme and wherein the second mapping scheme comprises a lattice modulation scheme.

27. The method of claim 15, wherein the first mapping scheme comprises a spherical modulation scheme and wherein the second mapping scheme comprises a lattice modulation scheme.

28. The apparatus of claim 20, wherein the first mapping scheme comprises a spherical modulation scheme and wherein the second mapping scheme comprises a lattice modulation scheme.

29. The apparatus of claim 1, wherein a first layer of the code comprises a concatenated space time block code (STBC) and a trellis code.

30. The apparatus of claim 1, wherein the apparatus is configured to sum a first layer and the second layer of the code generating full diversity at the first and second antenna transducers.

31. The apparatus of claim 30, wherein the first layer of the code comprises a low modulus property that is utilized by a receiver to generate a maximum likelihood path defining selection of values of the first and second set of values.

32. The method claim 15, wherein a first layer of the code comprises a concatenated space time block code (STBC) and a trellis code.

33. The method of claim 15, further comprising summing a first layer and the second layer of the code generating full diversity at the first and second antenna transducers.

34. The method of claim 33, wherein the first layer of the code comprises a low modulus property that is utilized by a receiver to generate a maximum likelihood path defining selection of values of the first and second set of values.

35. The apparatus of claim 20, wherein a first layer of the code comprises a concatenated space time block code (STBC) and a trellis code.

36. The apparatus of claim 20, further comprising means for summing a first layer and the second layer of the code generating full diversity at the first and second antenna transducers.

37. The apparatus of claim 36, wherein the first layer of the code comprises a low modulus property that is utilized by a receiver to generate a maximum likelihood path defining selection of values of the first and second set of values.

38. The apparatus of claim 1, wherein an error spectra of at least a first layer and the second layer of the composite code corresponds to the fewest errors shared in common by the first and second layers.

39. The method of claim 15, further comprising determining that an error spectra of at least a first layer and the second layer of the composite code corresponds to the fewest errors shared in common by the first and second layers.

40. The apparatus of claim 20 further comprising means for determining that an error spectra of at least a first layer and the second layer of the composite code corresponds to the fewest errors shared in common by the first and second layers.

* * * * *